United States Patent Office.

PETER MARTIN, OF FOREST GROVE, OREGON.

Letters Patent No. 80,646, dated August 4, 1868; antedated April 4, 1868.

IMPROVEMENT IN MANUFACTURING AND PURIFYING SPIRITS.

*The Schedule referred to in these Letters Patent and making part of the same.*

TO ALL WHOM IT MAY CONCERN:

Be it known that I, PETER MARTIN, of Forest Grove, county of Washington, and State of Oregon, have invented an Improved Process of Distilling and Purifying Spirits; and I do hereby declare that the best mode which I have discovered for performing said process is described in the following specification, and the best apparatus which I have found or devised for performing the same.

The nature of my invention is to provide an improved method of distillation or manufacture of spirits, such as alcohol and other low-proof spirits, and purifying the same, either during the process of manufacture, or after the same has been performed.

For carrying the first part of my process into effect, I make use of the common still, having first lined the interior, the worm, with tin.

I then take the grain from which the liquor is to be made, and soak it six hours in water, and draw off in a tank. Add water again to the grain, and soak for four hours more, and draw this off into the tank containing the six-hours liquor. The whole is then allowed to ferment, by adding yeast and hop-water, to keep the fermentation up, for forty-eight hours, when it is placed in the still, and run through. A part of the first run is saved by itself, and the remainder run through again, after which I add two pounds of salt, more or less, to the barrel, and place the whole, together with the part of the first run above described, in the still again, and run it through, taking care not to let the sediment of the last run escape into the purified liquor.

For making malt-liquors, the process is much the same as above described. Where molasses is used for making the spirits, I add two and one-half gallons of water to one gallon of molasses, and ferment it with yeast, say, five gallons of yeast to thirty gallons of molasses and water. To keep the yeast alive, I add, occasionally, hop-water. After fermentation has taken place sufficiently, I run the whole liquor through the still twice. The last time, one-half is saved, for putting into casks. The other half, being weak, or what is called low-wines, is put in with a new batch, and run through the still again, and so on continuously. In this part of the process, salt is also used, before the last run is made for putting in casks, in the proportion of two pounds to every thirty gallons, as above described.

For carrying the second part of my process into effect, which is to purify spirits already manufactured, I use a still lined with tin, in the same manner already described, and add two pounds of salt to the barrel of spirits, and run it through twice, saving only one-half, and that at the second run, as above described, until the whole run is finished, when the balance remaining may be run off as low-wines or low-proof spirits.

By this means, I obtain spirits that are chemically pure, yet the standard of proof will be a little lower than the ordinary alcohol; yet it will answer to cut the various gums and oils quite as well as, or a little better than, the alcohol of commerce, and will answer for all of the various purposes of medicine, the arts, and trades.

Having thus described my invention, what I claim, and desire to secure by Letters Patent, is—

1. The manufacture of alcohol, and other spirits, in the manner substantially as herein described.

2. The use of saline matter for manufacturing and purifying spirits, in combination with my said process, substantially as described.

In witness whereof, I have hereunto set my hand and seal.

PETER MARTIN. [L. S.]

Witnesses:
JOHN Q. ADAMS,
C. W. M. SMITH.